United States Patent [19]
Ruof

[11] 3,922,640
[45] Nov. 25, 1975

[54] MAXIMUM AND MINIMUM BRAKE TEMPERATURE INDICATOR

[75] Inventor: Edgar J. Ruof, Akron, Ohio

[73] Assignee: Goodyear Aerospace Corporation, Akron, Ohio

[22] Filed: Oct. 1, 1973

[21] Appl. No.: 402,155

[52] U.S. Cl. ............... 340/57; 73/341; 340/228 R
[51] Int. Cl.² ................. G01K 13/02; G08B 17/06
[58] Field of Search .... 340/52 B, 57, 227 R, 227 D, 340/228 R, 231, 413, 248 A, 248 C, 253 A; 307/10 R, 231; 188/1 A; 73/341, 342; 328/117, 148, 149

[56] References Cited
UNITED STATES PATENTS

| | | | |
|---|---|---|---|
| 3,435,451 | 3/1969 | Weiss | 340/228 R |
| 3,459,925 | 8/1969 | Goosey et al. | 73/341 |
| 3,587,317 | 6/1971 | Ruof | 340/228 |
| 3,688,295 | 8/1972 | Tsoras et al. | 340/227 R |
| 3,719,071 | 3/1973 | Hohenberg | 73/341 |

Primary Examiner—John W. Caldwell
Assistant Examiner—Joseph E. Nowicki
Attorney, Agent, or Firm—F. W. Brunner; P. E. Milliken; E. W. Oldham

[57] ABSTRACT

A circuit for monitoring the temperature of each of a plurality of brakes on a vehicle. Electrical equivalents of the brake temperatures are transmitted to maximum and minimum temperature sensing circuits; the maximum temperature sensing circuit producing an output signal corresponding to the temperature of the hottest brake and the minimum temperature sensing circuit producing an output signal corresponding to the temperature of the coolest brake. The outputs of the maximum and minimum temperature sensing circuits are alternately applied to an indicator, thus producing a visible output indicia of the hottest and coolest brake temperatures. The outputs of the maximum and minimum temperature sensing circuits are also supplied to a difference amplifier, the output of which is indicative of the temperature difference between the hottest and coolest brake. The output of the difference circuit is compared in a comparator circuit with a preset level and, if the difference exceeds this level, a warning device is actuated.

8 Claims, 1 Drawing Figure

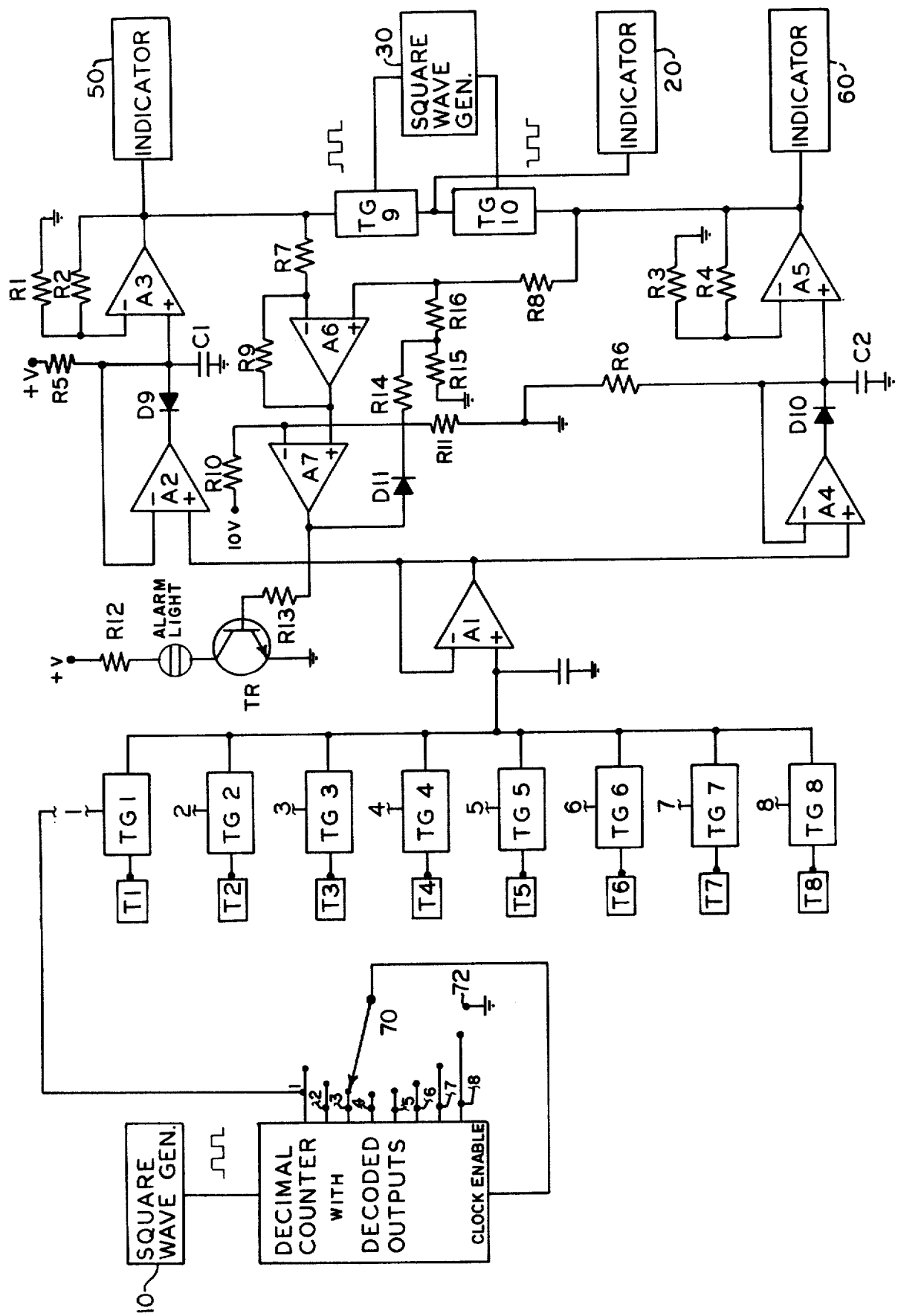

MAXIMUM AND MINIMUM BRAKE TEMPERATURE INDICATOR

BACKGROUND OF THE INVENTION

Heretofore various types of brake temperature sensing and indicating devices have been utilized in the transportation industry. such devices normally sense the temperatures of each of the individual wheel brake assemblies of the vehicle, compare these temperatures with a preselected tolerable level, and produce warning signals if the temperature of one of the wheel brake assemblies exceeds the tolerable level. However, such known systems are concerned primarily with an "over-temperature" condition which might result in brake burn-out or other type of brake failure. There are no known systems which are concerned with "under-temperature" conditions of the brake assemblies or in the relative degrees of temperature variation existing among the various brake assemblies of the vehicle.

With the advent of aircraft and other vehicles having a plurality of braked wheels and automatic braking systems, it is important to ascertain the relative amounts of braking being done by each of the various brake assemblies. The brake temperatures are known to be good indicators of braking effort. It is especially advantageous to know when one or more of the brake assemblies are not providing braking action or are providing appreciably less braking action than are the other brake assemblies. This information may be indicative of degradation or pending failure of the associated brake assembly or control system.

Consequently, it is an object of the instant invention to present a maximum and minimum brake temperature indicator which senses and relates to an operator the highest and lowest temperatures at which any of a plurality of brake assemblies are operating.

Another object of the invention is to provide a maximum and minimum brake temperature indicator which produces a warning signal when the temperature differential between the hottest and coolest operating brake assemblies exceeds a preselected level.

Yet another object of the invention is to present a maximum and minimum brake temperature indicator which allows the operator to monitor the temperature of each of a plurality of brake assemblies on an individual basis.

Still another object of the invention is to present a maximum and minimum brake temperature indicator which is simplistic in design, inexpensive to construct, reliable in operation, and readily adaptable for implementation upon any of numerous presently existing vehicles.

These objects and other objects which will become apparent as the detailed description proceeds are achieved by a brake temperature sensing circuit for at least two brake units, comprising: first circuit means sensing the temperature of all brakes and indicating the one with the highest temperature; second circuit means sensing the temperature of all brakes and indicating the one with the lowest temperature; and comparator means connected to and sensing the outputs from the first and second circuit means and producing a signal when the difference between the two exceeds a predetermined amount.

For a clear understanding of the techniques and structure of the invention reference should be had to the following detailed description and accompanying drawing wherein there is shown a schematic diagram of the circuitry of the invention.

Referring now to the drawing, it can be seen that a square wave generator 10 supplies a clocking pulse to a decimal counter with decoded outputs. The outputs of the decimal counter sequentially go from ground to the supply voltage level and then back to ground. Consequently, the outputs 1–8 of the decimal counter are sequentially pulsed with each output being turned on for a period of time equivalent to one cycle of the clock signal. Of course, the outputs 1–8 of the decimal counter are sequentially turned on in a mutually exclusive manner such that only one output is present during each cycle of the clock pulse.

The outputs 1–8 of the decimal counter are supplied to the gating inputs of the transmission gates TG1-TG8. Consequently, these gates are sequentially enabled so as to pass data therethrough. The inputs to the transmission gates TG1–TG8 are the voltages T1–T8 coming from temperature sensors associated with the various brakes on the vehicle. The temperature signals T1–T8 may be generated in the normal manner by means of thermocoupleamplifier circuitry comprising a temperature transducer as taught by U.S. Pat. No. 3,688,295. Suffice it to say that there is presented at the inputs of each of the transmission gates TG1-TG8 a particular voltage T1–T8 corresponding to the temperature of an associated brake assembly.

The outputs of the transmission gates TG1–TG8 are wired together and fed to the positive input of the buffer amplifier A1. It should be readily apparent that the input to the amplifier A1 will thus be a multiplexed plurality of pulses of a frequency and duration dependent upon the frequency of the clock pulse and square wave generator 10 and of varying amplitudes depending upon the amplitudes of the various temperature voltages T1–T8. The output of the buffer amplifier A1 is of course the same as the inputs thereto and thus constitutes a chain of random up-or-down steps with each step being the level of voltage of the associated temperature voltage T1–T8.

The output of the amplifier A1 is passed to the positive input of the amplifier A2, the output of which is connected to the cathode of the diode D9. The anode of the diode D9 is connected to the non-grounded side of the capacitor C1 and back to the negative input of the amplifier A2. As can be seen, the capacitor C1 is also connected through a high impedance resistance R5 to a positive voltage level. The presence of the diode D9 causes the amplifier A2 to react to the lowest step voltage output from the amplifier A1 and store this value in the capacitor C1. Although the voltage of the capacitor C1 will tend to drift to a higher level because of the connection thereof through the resistor R5 to a positive voltage level, the drift is relatively slow in nature due to the high resistance (preferably 200k) of the resistor R5 so that each time the lowest transducer voltage appears at the positive input of the amplifier A2, the capacitor C1 is again pulled down to that level. As should be apparent to those skilled in the art, the higher voltage steps have no effect on the voltage of the capacitor because of the interconnection of the diode D9.

The voltage level stored on the capacitor C1 is passed to the positive input of the amplifier A3, the output of which is representative of the temperature of the coolest sensor. The values of the resistors R1 and R2 of course control the gain of the amplifier A3 and are governed by the characteristics of the indicator to be driven thereby. It should be readily apparent that a meter or other indicating device 50 might be connected to the output of the amplifier A3 to give a visual indicia of the temperature of the coolest sensor. As will be discussed hereinafter, the instant invention contemplates the sharing of a single indicator for monitoring both the hottest and coolest sensors; hence indicator 50 is not required.

The output of the amplifier A1 is also connected to the positive input of the amplifier A4 which is the counterpart of the amplifier A2 discussed hereinabove. The output of the amplifier A4 is connected to the anode of the diode D10. The cathode of the diode D10 is connected to the un-grounded side of the capacitor C2 and also fed back to the negative input of the amplifier A4. As is shown, the capacitor C2 is also connected through a high impedance resistor (200k) R6 to ground. As should be readily apparent, the presence of the diode D10 causes the amplifier A4 to respond to the highest level of the step voltages evidenced at the output of the amplifier A1; this level being stored by the capacitor C2. The positive input of the amplifier A5 is connected to the capacitor C2 and consequently receives the voltage level indicative of the temperature of the hottest sensor. Again, resistors R3 and R4 are provided for purposes of selecting the appropriate gain for the amplifier A5 in accordance with the particular indicator to be connected thereto. It should of course again be noted that an appropriate indicating device 60 could be connected directly to the output of the amplifier A5 for purposes of presenting a visual indicia of the temperature of the hottest operating brake.

As can be seen, FIG. 1 teaches the utilization of a single indicator 20 to be time shared by the cool temperature amplifier A3 and the hot temperature amplifier A5. To this end, the transmission gates TG9 and TG10 have the outputs thereof wired together and passed to an appropriate indicator 20. The gating inputs of the transmission gates TG9 and TG10 are connected to a squarewave generator 30. As can be seen, the pulses applied to the respective gating inputs are complementary so that the transmission gates TG9 and TG10 are never simultaneously conductive. It is contemplated that the square wave generator 30 will be of a 0.125HZ frequency such that the gates TG9 and TG10 will be alternately conductive for 4 second intervals. There will consequently be passed to the indicator 20 from the outputs of the amplifiers A3 and A5 and through the transmission gates TG9 and TG10, respectively, voltages corresponding to the coolest and hottest temperature sensors in the system. Consequently, the indicator 20 will, for alternate 4 second intervals, indicate the exact temperatures of the coolest and hottest operating brakes in the system.

It should here be briefly noted that the indicators to be utilized in the system may be of any suitable nature and may be of the analog type utilizing a D'Arsonval meter movement or could indeed be of the digital panel meter type receiving an analog input and producing a visual digital output.

The outputs of the amplifiers A3 and A5 respectively feed through the resistors R7 and R8 to the negative and positive inputs of the amplifier A6. As should be readily apparent, this amplifier is a differencing amplifier connected such that the output thereof is equivalent to the difference between the voltages evidenced at the outputs of the amplifiers A3 and A5. A meter or other indicating device such as the indicator 20 could be connected directly to the output of the amplifier A6 so as to register the temperature difference between the hottest and coolest brakes. In the preferred embodiment of the invention however the output of the amplifier A6 is passed to the positive input of the amplifier A7 which operates as a switch to turn on the transistor TR when the output of the amplifier A6 exceeds a predetermined amount as determined by the voltage divider comprising resistors R10 and R11. The output of the amplifier A7 is connected to the base of the transistor TR through the resistor R13. A conductive state of the transistor TR energizes an alarm light connected to the collector thereof and to a positive voltage level through a resistor R12. The energization of the alarm light indicates to the operator that the temperature difference between the hottest and coolest brakes exceeds the amount preset by the voltage applied to the negative input of the amplifier A7 by the voltage divider comprising resistors R10 and R11.

A hysteresis effect is provided to prevent instability when the amplifier is near the turn-on or turn-off point of the light. The hysteresis feedback loop from the output of the amplifier A7 to the positive input of the amplifier A6 is provided in a novel manner by means of the diode D11 and the resistors R14–R16.

A particular attribute of the invention is that means may be provided in association with the basic circuitry thereof whereby an operator may monitor the temperatures of each of the individual brake assemblies of the vehicle. To this end, a selector switch 70 is connected to the CLOCK ENABLE input of the decimal counter and is operative to select any of the outputs 1–8 thereof or a ground pin 72. It should be noted that the decimal counter with decoded outputs is contemplated to be similar to the element CD4022 manufactured by RCA and described in File No. 479 of the 1973 Edition of RCA Cos/Mos Digital Integrated Circuits published and copyrighted in 1972 by RCA. Utilizing such a decimal counter, when the switch 70 is grounded on the pin 72 a clock from the generator 10 will cause the sequential pulsing of the outputs 1–8 as discussed hereinabove. However, when the CLOCK ENABLE input is set to a high level the clock is inhibited and the outputs of the decimal counter are latched at those levels at which they existed when the clock was inhibited. If the selector switch 70 is caused to pass any one of the outputs 1–8 of the decimal counter to the CLOCK ENABLE input then, when the particular output selected switches to a logic 1 level, this level is passed through the switch 70 to the CLOCK ENABLE input and inhibits any further clocks from effecting the decimal counter. Consequently, that particular one of the outputs 1–8 which has been selected by the switch 70 will be latched at a logic 1 level while all other outputs 1–8 will be at a logic 0 level. Consequently, the associated transmission gate (TG1–TG8) will be in a conductive state and pass to the positive input of the amplifier A1 a signal indicative of the temperature of the selected brake assembly. The output of the amplifier A1 will thus be a level rather than the multiplexed plurality of pulses described in relation to the normal operation of the circuitry. Thus the outputs of the amplifier A2 and A4 and consequently the amplifiers A3 and A5 will be voltage levels indicative of the temperature of the selected brake assembly. The identical outputs of the amplifiers A3 and A5 will, through the gates TG9 and TG10, result in a continuous reading on the indicator 20 of the temperature of the selected brake.

It should now be appreciated that the instant invention uniquely utilizes but a single indicator 20 to monitor the temperature of the hottest operating brake, the coolest operating brake, and the temperature of each of the brakes on a selectable basis.

Thus it can be seen that the instant invention provides means for indicating the temperature of the hottest brake on a vehicle, the temperature of the coolest brake on the vehicle, indicia of whether the temperature difference between the hottest brake and the coldest brake exceeds a specific level, and further provides the ability to individually monitor the temperatures of each of the brakes.

It should now be apparent that the objects of the invention have been achieved by the circuitry and structure presented hereinabove. While in accordance with the Patent Statutes only the best mode and preferred embodiment of the invention contemplated by the inventor have been presented and described in detail, it is to be understood that the invention is not limited thereto or thereby. Consequently, for an appreciation of the breadth and scope of the invention reference should be had to the appended claims.

What is claimed is:

1. A device for use on a vehicle having a plurality of braking units for monitoring operating temperatures of the hottest and coolest brake units and a temperature difference therebetween, comprising:

first circuit means connected to the brake units for sensing the temperature of each of the brake units and producing output signals indicative thereof;

a first operational amplifier circuit connected to the first circuit means and including a first capacitor, said first capacitor being charged to produce an output signal indicative of the temperature of the coolest brake unit;

a second operational amplifier circuit connected to the first circuit means and including a second capacitor, said second capacitor being charged to produce an output signal indicative of the temperature of the hottest brake units;

second circuit means connected to the first and second operational amplifier circuits for producing a signal when the temperature difference between the hottest and coolest brake units exceeds a predetermined amount; and a single indicator connected to and mutually exclusively monitoring the outputs of both the first and second operational amplifier circuits on a time-sharing basis, and producing a visual indicia of said outputs.

2. The device as recited in claim 1 wherein the first circuit means includes a plurality of thermocouples, one associated with each brake unit, connected to means for sequentially gating the outputs of the thermocouples to the first and second operational amplifier circuits.

3. The device as recited in claim 1 wherein said second circuit means comprises a differencing amplifier interconnected between the first and second operational amplifier circuits and producing an output signal corresponding to the difference between the outputs of said operational amplifier circuits.

4. The device as recited in claim 3 wherein the second circuit means includes a hysteresis circuit operatively associated therewith to provide circuit stability when the temperature difference between the hottest and coolest brake is near the predetermined amount.

5. A brake temperature indicator circuit for at least two brake units, comprising:

multiplexing circuit means connected to each of the brake units for sequentially producing output signals indicative of the temperatures of each of the individual brake units;

first and second circuit means connected to the multiplexing circuit means for producing output DC levels respectively corresponding to a lowest and a highest amplitude output signal of the multiplexing circuit means;

third circuit means connected to and receiving the output DC levels of the first and second circuit means and producing an output signal when the difference between the output levels of the first and second circuit means exceed a particular level; and indicator means interconnected between the first and second circuit means and multiplexed to alternately indicate the temperatures of the brake units corresponding to the lowest and highest amplitude output signals.

6. The brake temperature indicator circuit as recited in claim 5 wherein the first and second circuit means comprise operational amplifiers having the outputs thereof connected through biasing diodes to charging capacitors, the first and second circuit means being respectively biased to receive and store the lowest and highest amplitude output signals of the multiplexing circuit means.

7. The brake temperature indicator circuit as recited in claim 5 wherein the third circuit means includes a differencing amplifier connected to a comparator, the comparator comparing the output of the differencing amplifier with a fixed level.

8. The brake temperature indicator circuit as recited in claim 5 which further includes a selector switch means connected to the multiplexing circuit means for selecting and individually monitoring the specific temperature of any particular brake unit.

* * * * *